(12) United States Patent
Knauth et al.

(10) Patent No.: US 8,639,553 B1
(45) Date of Patent: Jan. 28, 2014

(54) PREDICTIVE GROWTH BURN RATE IN DEVELOPMENT PIPELINE

(75) Inventors: Margaret J. Knauth, Overland, KS (US); Debra L. Roberts, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1168 days.

(21) Appl. No.: 11/403,669

(22) Filed: Apr. 13, 2006

(51) Int. Cl.
*G06Q 10/00* (2012.01)
*G06Q 10/06* (2012.01)

(52) U.S. Cl.
CPC .. *G06Q 10/06312* (2013.01); *G06Q 10/063114* (2013.01)
USPC ........................................ 705/7.22; 705/7.15

(58) Field of Classification Search
USPC .................................................. 705/7.22, 7.15
See application file for complete search history.

(56) References Cited

U.S. PATENT DOCUMENTS

| | | | |
|---|---|---|---|
| 5,408,663 A | 4/1995 | Miller | |
| 5,619,695 A | 4/1997 | Arbabi et al. | |
| 5,907,490 A * | 5/1999 | Oliver | 700/90 |
| 5,953,707 A | 9/1999 | Huang et al. | |
| 6,032,121 A | 2/2000 | Dietrich et al. | |
| 6,216,109 B1 | 4/2001 | Zweben et al. | |
| 6,519,763 B1 | 2/2003 | Kaufer et al. | |
| 6,678,671 B1 | 1/2004 | Petrovic et al. | |
| 6,687,677 B1 | 2/2004 | Barnard et al. | |
| 6,714,915 B1 | 3/2004 | Barnard et al. | |
| 6,993,533 B1 | 1/2006 | Barnes | |
| 7,080,024 B2 * | 7/2006 | Thompson | 705/8 |
| 7,089,193 B2 | 8/2006 | Newbold | |
| 7,139,720 B1 | 11/2006 | Foell et al. | |
| 7,139,999 B2 | 11/2006 | Bowman-Amuah | |
| 7,222,082 B1 * | 5/2007 | Adhikari et al. | 705/8 |
| 7,222,330 B2 | 5/2007 | Bicknell et al. | |
| 7,613,623 B2 | 11/2009 | Nemecek et al. | |
| 7,962,358 B1 | 6/2011 | Fernandez et al. | |
| 8,001,226 B2 | 8/2011 | Matsumoto et al. | |
| 8,280,756 B1 | 10/2012 | Kanemoto et al. | |
| 8,341,591 B1 | 12/2012 | Knauth et al. | |
| 2002/0165742 A1 | 11/2002 | Robins | |
| 2003/0018952 A1 | 1/2003 | Roetzheim | |
| 2003/0083891 A1 | 5/2003 | Lang et al. | |
| 2003/0083912 A1 * | 5/2003 | Covington et al. | 705/7 |
| 2003/0126141 A1 | 7/2003 | Hassman et al. | |
| 2004/0001103 A1 * | 1/2004 | Fliess et al. | 345/810 |
| 2004/0073467 A1 | 4/2004 | Heyns et al. | |
| 2004/0078254 A1 | 4/2004 | Piechl et al. | |
| 2004/0111306 A1 | 6/2004 | Yokota et al. | |
| 2004/0117046 A1 | 6/2004 | Colle et al. | |

(Continued)

OTHER PUBLICATIONS

Final Office Action dated Dec. 18, 2009, U.S. Appl. No. 11/403,701, filed Apr. 13, 2006, 16 pgs.

(Continued)

*Primary Examiner* — Susanna M Meinecke Diaz
*Assistant Examiner* — Jamie Swartz (57) ABSTRACT

A method is provided for predictive growth and burn rate analysis in software pipeline management. The method comprises providing, for each of multiple projects in a software project pipeline, a set of inputs that includes labor demand, labor supply, and one or more historical data points. The method also includes aggregating the inputs, and calculating an overall labor supply/demand balance. The method then compares the difference between the balance and the historical data points to a reasonable threshold.

15 Claims, 3 Drawing Sheets

(56) References Cited

U.S. PATENT DOCUMENTS

| | | | |
|---|---|---|---|
| 2004/0162748 A1 | 8/2004 | Vogel et al. | |
| 2004/0162749 A1 | 8/2004 | Vogel et al. | |
| 2004/0162753 A1* | 8/2004 | Vogel et al. | 705/10 |
| 2005/0114829 A1 | 5/2005 | Robin et al. | |
| 2005/0114830 A1 | 5/2005 | Knutson et al. | |
| 2005/0120332 A1 | 6/2005 | Martin et al. | |
| 2005/0137920 A1 | 6/2005 | O'Connor et al. | |
| 2006/0010418 A1 | 1/2006 | Gupta et al. | |
| 2006/0053043 A1 | 3/2006 | Clarke | |
| 2006/0129439 A1 | 6/2006 | Arlt et al. | |
| 2006/0167732 A1 | 7/2006 | Ricketts | |
| 2006/0235732 A1 | 10/2006 | Miller et al. | |
| 2007/0006161 A1 | 1/2007 | Kuester et al. | |
| 2007/0073576 A1* | 3/2007 | Connors et al. | 705/10 |
| 2007/0100685 A1 | 5/2007 | Brickhaus et al. | |
| 2007/0112945 A1 | 5/2007 | Brown et al. | |
| 2007/0179871 A1 | 8/2007 | Minor et al. | |
| 2008/0110971 A1 | 5/2008 | Pover et al. | |
| 2008/0183549 A1 | 7/2008 | Connors et al. | |

OTHER PUBLICATIONS

Kanemoto, Michael W., et al,, "Milestone Initial Scheduling," filed Aug. 3, 2005, U.S. Appl. No. 11/196,692, Specification (23 pgs.) and Drawings (3 sheets).

Crum, James L., et al., "Spreading Algorithm for Work and Time Forecasting," filed Aug. 3, 2005, U.S. Appl. No. 11/195,964, Specification (25 pgs.) and Drawings (4 sheets).

Knauth, Margaret J., et al., "A Method and Software Tool for Real-Time Optioning in a Software Development Pipeline," filed Apr. 13, 2006, U.S. Appl. No. 11/403,773. Specification (32 pgs.) and Drawings (9 sheets).

Kanemoto, Michael W., et al., "Hardware/Software and Vendor Labor Integration in Pipeline Management," filed Apr. 13, 2006, U.S. Appl. No. 11/403,652, Specification (30 pgs.) and Drawings (6 sheets).

Knauth, Margaret J., et al., "Project Pipeline Management Systems and Methods Having Capital Expenditure/Expense Flip Targeting," filed Apr. 13, 2006, U.S. Appl. No. 11/403,701, Specification (31 pgs.) and Drawings (6 sheets).

Alsup, Lance A., et al., Patent Application entitled, "Project Estimator", filed Jul. 21, 2006, U.S. Appl. No. 11/491,203.

Deltek—Resource Planning and Project Budgeting Software for Professional Consultants: Wind 2, "Wind2 Resource Scheduling and Budgeting (RSB)," http://www.wind2.com/products/rsb.asp, Oct. 12, 2005, Wind2 Software Inc., 8 pgs.

Heires, James T., et al., What I Did Last Summer: A Software Development Benchmarking Case Study, IEEE Software, Sep./Oct. 2001, pp. 33-39.

Lipner, Steve, "The Trustworthy Computing Security Development Cycle," IEEE Security Conference, Dec. 2004, 12 pages.

Musselman, Kenneth, et al., "The Role of Simulation in Advanced Planning and Scheduling," IEEE Simulation Conference 2002, vol. 2, Dec. 2002, pp. 1825-1830.

Pham, Hoang, et al., "Software Cost Model With Warranty and Risk Costs," IEEE Transactions on Computers, vol. 48, No. 1, Jan. 1999, pp. 71-75.

Office Action dated Sep. 16, 2009, U.S. Appl. No. 11/196,692, filed Aug. 3, 2005, 36 pages.

Office Action dated May 7, 2009, U.S. Appl. No. 11/195,964, filed Aug. 3, 2005, 14 pgs.

Office Action dated Jun. 9, 2009, U.S. Appl. No. 11/403,701, filed Apr. 13, 2006, 16 pgs.

Office Action dated Oct. 30, 2009, U.S. Appl. No. 11/195,964, filed Aug. 3, 2005, 19 pgs.

Office Action dated Mar. 30, 2010, U.S. Appl. No. 11/403,652, filed Apr. 13, 2006, 26 pgs.

Aoyama, Mikio, "Agile Software Process and Its Experience," Department of Information and Electronics Engineering, IEEE, Niigata Institute of Technology, 1998, pp. 3-12.

Chapman, C., et al., "Constructively Simple Estimating: A Project Management Example," Oct. 2003, The Journal of the Operational Research Society, vol. 54, No. 10, p. 1050-1058.

Jandourek, Emil, "A Model for Platform Development," Hewlett-Packard Journal, Aug. 1996, pp. 1-18.

The Free Dictionary, Definition of Rate Equation, Reaction Rate, http://encyclopedia2.the freedictionary.com/Rate+equation+(chemistry) , 3 pages.

Final Office Action dated Apr. 13, 2010, U.S. Appl. No. 11/196,692, filed Aug. 3, 2005, 47 pages.

Final Office Action dated May 11, 2010, U.S. Appl. No. 11/195,964, filed Aug. 3, 2005, 39 pgs.

Armour, Phillip, "Ten Unmyths of Project Estimation," Communications of the ACM, Nov. 2002, vol. 45. No. 11, 4 pgs.

Office Action dated Jun. 8, 2010, U.S. Appl. No. 11/491,203, filed Jul. 21, 2006, 39 pgs.

Cohen, Morris A., et al., "New Product Development: The Performance and Time-to-Market Tradeoff," Management Science, vol. 42, No. 2, Feb. 1996, 15 pgs.

Advisory Action dated Jun. 28, 2010, U.S. Appl. No. 11/196,692, filed Aug. 3, 2005, 3 pgs.

Advisory Action dated Jul. 22, 2010, U.S. Appl. No. 11/195,964, filed Aug. 3, 2005, 3 pgs.

Dean, Burton V., et al., "Multiproject Staff Scheduling with Variable Resource Constraints," IEEE Transactions on Engineering Management, vol. 39, No. 1, Feb. 1992, pp. 59-72.

Pfahl, Dietmar, et al., "Integration of System Dynamics Modeling with Descriptive Process Modeling and Goal-Oriented Measurement," The Journal of Systems and Software vol. 46, 1999, pp. 135-150.

Powell, Anthony, et al., "Strategies for Lifecycle Concurrency and Iteration—A System Dynamics Approach," The Journal of Systems and Software, 1999, vol. 46, pp. 151-161.

Office Action dated Aug. 19, 2010, U.S. Appl. No. 11/403,773, filed Apr. 13, 2006, 31 pgs.

Final Office Action dated Sep. 29, 2010, U.S. Appl. No. 11/403,652, filed Apr. 13, 2006.

Examiner's Answer dated Oct. 5, 2010, U.S. Appl. No. 11/403,701, filed Apr. 13, 2006.

Final Office Action dated Oct. 27, 2010, U.S. Appl. No. 11/491,203, filed Jul. 21, 2006.

Advisory Action dated Jul. 19, 2011, U.S. Appl. No. 11/403,773, filed Apr. 13, 2006.

Office Action dated May 9, 2011, U.S. Appl. No. 11/403,652, filed Apr. 13, 2006.

Notice of Allowance dated Jun. 7, 2012, U.S. Appl. No. 11/196,692, filed Aug. 3, 2005.

Notice of Allowance dated Aug. 9, 2012, U.S. Appl. No. 11/403,773, filed Apr. 13, 2006.

Deltek.com Webpages—Deltek Project Planner, Deltek, Mar. 2002, Retrieved from Arhcive.org May 18, 2010.

IBM—Introduction to Portfolio Management IBM, Rational Software, Sep. 2005.

IBM—Rational Portfolio Management—Product Data Sheet IBM, 2004.

Melik, Rudolf, et al., Professional Services Automation—Optimizing Project and Service Oriented Organizations, John Wiley & Sons, 2002.

Wolff, Mario, Project and Project Portfolio Management with SAP, 2002.

Decision on Appeal dated May 6, 2013, U.S. Appl. No. 11/195,964, filed Aug. 3, 2005.

Notice of Allowance dated Aug. 12, 2013, U.S. Appl. No. 11/195,964, filed Aug. 3, 2005.

Notice of Allowance dated Aug. 6, 2013, U.S. Appl. No. 11/403,652, filed Apr. 13, 2006.

Bott, M.F., "Software as a Corporate Asset" IEE Proc-Softw. vol. 147, No. 2, Apr. 2, 2000, 6pgs.

Lassila, Ora, et. al., "Toward the Development of Flexible Mixed-Initiative Scheduling Tools", Robotics Institute, Carnegie Mellow University, Mar. 15, 1994, 12 pgs.

(56) References Cited

OTHER PUBLICATIONS

Smith-Daniels, Dwight E., et al., "Heuristic Scheduling of Capital Constrained Projects", Journal of Operations Management 14, 1996, 14 pgs.

Ulusoy, Gündüz, et al., "A framework for an interactive project scheduling system under limited resources," European Journal of Operational Research 90, 1996, 14 pgs.

Office Action dated May 9, 2012, U.S. Appl. No. 11/403,773, filed Apr. 13, 2006.

Fox, Mark S., et al. "ISIS—a knowledge-based system for factory scheduling," Expert Systems, vol. 1, No. 1, Jul. 1984.

Final Office Action dated Feb. 9, 2011, U.S. Appl. No. 11/403,773, filed Apr. 13, 2006.

Decision on Appeal dated Jan. 15, 2013, U.S. Appl. No. 11/403,701, filed Apr. 13, 2006.

Final Office Action dated Oct. 4, 2011, U.S. Appl. No. 11/196,692, filed Aug. 3, 2005.

Final Office Action dated Nov. 17, 2011, U.S. Appl. No. 11/403,652, filed Apr. 13, 2006.

Examiner's Answer dated Sep. 12, 2011, U.S. Appl. No. 11/491,203, filed Jul. 21, 2006.

Examiner's Answer dated Sep. 21, 2011, U.S. Appl. No. 11/491,203, filed Jul. 21, 2006.

Examiner's Answer dated Jan. 4, 2011, U.S. Appl. No. 11/195,964, filed Aug. 3, 2005.

Advisory Action dated Dec. 23, 2010, U.S. Appl. No. 11/403,652, filed Apr. 13, 2006.

Advisory Action dated Jan. 6, 2011, U.S. Appl. No. 11/491,203, filed Jul. 21, 2006.

Leffingwell, Dean, et al., "Tactical Management of Agile Development: Achieving Competitive Advantage," Rally Software Development Corporation, 2004.

Rautiainen, Kristian, et al., "4CC: A Framework for Managing Software Product Development," Helsinki University of Technology, Engineering Management Journal, vol. 14, No. 2, Jun. 2002, pp. 27-32.

Smith, Stephen F., et al., "Scheduling and Visualization," Final Technical Report AFRL-IF-RS-TR-2004-142, Jun. 2004, Carnegie Mellon University.

Office Action dated Mar. 29, 2011, U.S. Appl. No. 11/196,692, filed Aug. 3, 2005.

Final Office Action dated Apr. 27, 2011, U.S. Appl. No. 11/403,773, filed Apr. 13, 2006.

\* cited by examiner

PREDICTIVE GROWTH BURN RATE IN DEVELOPMENT PIPELINE

CROSS-REFERENCE TO RELATED APPLICATIONS

This application relates to U.S. patent application Ser. No. 11/195,964, filed Aug. 8, 2005, entitled "Spreading Algorithm for Work and Time Forecasting," by James Crum, et al, which is incorporated herein for reference for all purposes. This application relates to U.S. patent application Ser. No. 11/196,692, filed Aug. 3, 2005, entitled "Milestone Initial Scheduling," by Michael Kanemoto, et al, which is incorporated herein for reference for all purposes. This application relates to U.S. patent application Ser. No. 11/403,652, filed concurrently, entitled "Hardware/software and Vendor Labor Integration in Pipeline Management," by Kanemoto et al, which is incorporated herein for reference for all purposes. This application relates to U.S. patent application Ser. No. 11/403,701, filed concurrently, entitled "Project Pipeline Management Systems and Methods Having Capital Expenditure/Expense Flip Targeting," by Knauth et al, which is incorporated herein for reference for all purposes. This application relates to U.S. patent application Ser. No. 11/403,773, filed concurrently, entitled "Method and Software Tool for Real-Time Optioning in a Software Development Pipeline," by Knauth et al, which is incorporated herein for reference for all purposes.

BACKGROUND

In a business enterprise, a significant number of projects may be underway in parallel (e.g., in a software development pipeline) at any given time. Over time, progress in or completion of each project may require personnel with specific skill sets and experience. For this reason, a project may be described as having a certain demand, in terms of human resources and skill sets. In order to ensure that demand will be met over the course of a given project, managers of projects assess what the specific demand is for their own project. In a large enterprise with significant numbers of projects in the development pipeline, assessing the overall demand and how to meet it is complex. Over time, demand may grow in such a way that it exceeds the available resources, i.e., the supply.

In an enterprise, the human resources available represent the supply to meet the above-described demand. The supply may comprise individuals grouped in various ways according to the skill sets of each individual. In any enterprise, the supply of human resources, and particularly of valuable skill sets, varies over time as new individuals are hired, existing employees voluntarily leave or are laid off, and individuals come and go from the enterprise as contract workers. Supply may be accounted for in units of hours or a number or percentage of Full Time Employees ("FTEs").

Effectively balancing the demand and the supply of human resources, and predicting how each may be increased or decreased in the future as needed are challenging tasks. Software tools can facilitate the task of assessing and growth planning for supply and demand of human resources.

SUMMARY

According to various embodiments, a software development pipeline planning tool is provided. The tool includes an interface component to accept, for each of multiple projects in a software pipeline, a set of inputs that includes 1) labor demand, 2) labor supply, and 3) one or more historical data points; and a growth analysis component. The growth analysis component aggregates the inputs, calculates an overall labor supply/demand balance, and compares the difference between the balance and the historical data points to a reasonable threshold.

In various embodiments, a method for predictive growth and burn rate analysis in software pipeline management is provided. The method includes providing, for each of multiple projects in a software project pipeline, a set of inputs that includes labor demand, labor supply, and one or more historical data points. The method also includes aggregating the inputs, calculating an overall labor supply/demand balance, and comparing the difference between the balance and the historical data points to a reasonable threshold.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or not yet in existence. The present disclosure should in no way be limited to the illustrative implementations, drawings, and techniques illustrated below.

Predictive growth burn rate in a development pipeline may be analyzed by aggregating supply and demand inputs into a model predictive of achievable growth. In such an aggregate model, one or more constraints between labor supply and labor demand are reflected over the course of time in completing each project in the pipeline. Preemptively analyzing a balance between the labor supply and the labor demand (i.e., a comparison between the labor supply and the labor demand in the aggregate) over the course of the project to eliminate one or more of the resource constraints results in more accurate planning for growth that is realistically achievable. For example, when the aggregate model reflects that demand will exceed supply by a significant amount during a particular planning quarter, decision makers can plan ahead to gradually grow the labor supply (within realistic limits on how quickly the supply can be increased) to meet the demand at that point in time. Similarly, when the aggregate model reflects that supply will exceed demand by a significant amount during a particular planning quarter, decision makers may plan ahead to develop more projects (within realistic limits of how readily new demand can be developed) that will make use of the supply during the time period with excess supply, or may plan to cut back on jobs or hiring during that time period.

A software development pipeline, as referred to herein, is a tool for long term project management for ongoing and planned projects in various phases of development. The software development pipeline is analogous to a manufacturing assembly line or pipeline, in which different parts of tangible products are being manufactured or assembled at the same time although ultimately there may be some parts that have to be manufactured or assembled before others are. Even if there is some sequential dependency between manufacturing and assembly, the overall process can take advantage of those operations that can proceed concurrently. Likewise, in a software development pipeline, various portions of software development projects may be pursued simultaneously or sequentially.

In various embodiments, the projects are computer software development projects, such as for enterprise software applications. In various embodiments, the software development pipeline is defined by a six quarter planning period. For planning completion of projects in a software development pipeline, resources such as labor, vendor labor, hardware and software, as well as the associated expenses for each, give an accurate assessment of whether a project can reasonably be completed within a budget.

In the present disclosure, demand, as discussed above, can be realistically analyzed according to the hours of work per month needed to complete the various projects in the pipeline (otherwise referred to as the burn rate). In the present disclosure, supply, as discussed above, can be realistically analyzed according the hours of work per month available at a given point in time. In accordance with the present disclosure, a predictive model of achievable growth is generated by aggregating the input supply and demand and checking the difference between them against what is reasonable based on historical accomplishments. With the model, enterprise management may balance the demand and the supply by comparing the two in the aggregate to alleviate constraints and better plan for and manage growth over time, within the limits of reasonable expectations for growth, to most efficiently move projects through the pipeline. The predictive model may be compared to a historical burn rate based on actual numbers regarding how fast and efficiently work was performed in order to determine whether the predictive model is reasonable in light of prior successes. The supply used in developing the predictive model may, in various embodiments, be still more accurate by applying a productivity multiplier resulting from productivity analysis, which will be discussed in greater detail herein.

By building up a model of predictive growth that reflects the projects in the pipeline, individuals involved in managing a business enterprise have a holistic view of ongoing and planned projects in terms of resources needed to complete them, and whether the projects, as timed, fall within their budgets. In various embodiments, the model may be broken down according to business units or even individual projects, in addition to reflecting the entirety of the development pipeline. The model may then be compared to a historical actual burn rate and/or other historical inputs relating to past, completed projects to provide an accurate assessment of whether the model is reasonable and feasible, given what has been accomplished previously. The model may be rendered more accurate by applying a productivity multiplier to the aggregate supply, where the productivity multiplier varies monthly based on historical data on training schedules, vacation schedules, typical seasons of sick leave, time generally used in administration, and the like.

The present disclosure identifies resource constraints and limitations on how much growth can be reasonably expected during the planning stage of the development pipeline, reducing delivery schedule risk by enabling proactive resource planning. The present disclosure enables strategic resource planning through driven resource allocation, identification and proactive treatment of in-house and outsource resource gaps, tactical resource assignment on the fly, work force management, and reassignment/adjustment of resources.

A method and tool for predictive growth and burn management is disclosed. In the example described below, the project is a computer software development project, such as for an enterprise software application.

Figure 1:
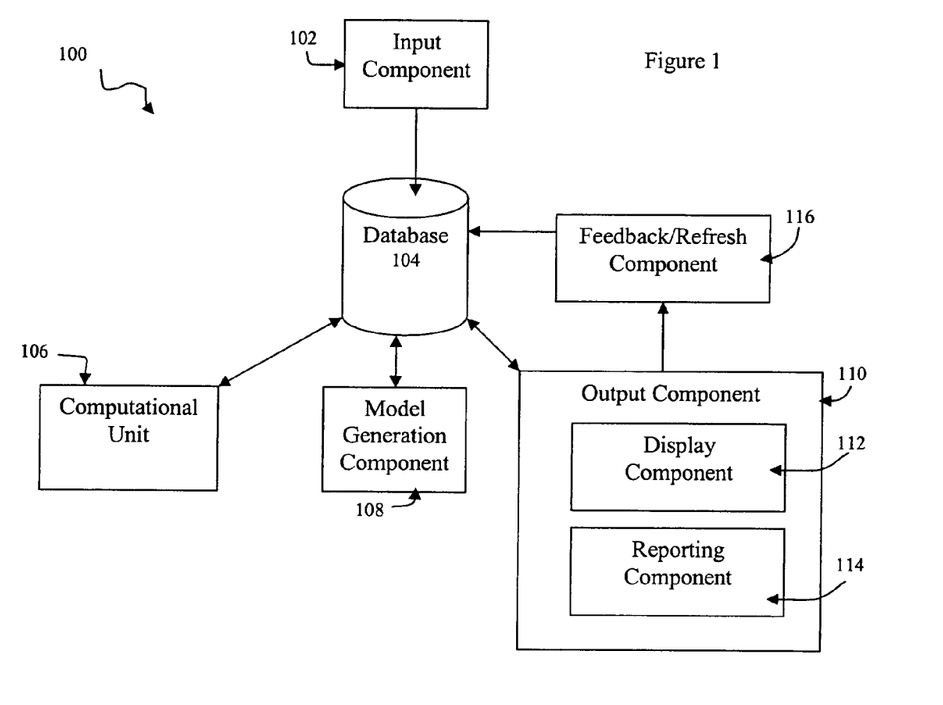
FIG. 1 is a logic flow diagram of a process according to various embodiments of the present disclosure.

Referring to FIG. 1, a block diagram of a predictive growth management tool is shown. The predictive growth management tool 100 includes an interface component 102, a database 104, a growth analysis component 108, a reporting component 110, and a productivity analysis component 118. In various embodiments, the tool 100 may also include a computational component 106.

The interface component 102, which comprises, for example, a Graphical User Interface ("GUI"), receives inputs from the user of the tool. The GUI 102 presents, in graphical or textual form, various data to the user of the tool. In various embodiments, the graphical user interface (GUI) 102 further comprises an editor window 104 and a evaluation window 106. The inputs may be obtained via the editor window 104, and the various data, including a model predicting achievable growth in supply and demand, may be presented via the evaluation window 106. In various embodiments, the user may manually switch between the editor window 104 and the evaluation window 106, or alternatively the tool 100 may autonomously switch between the editor window 104 and the evaluation window 106. In yet other embodiments, the functions of the evaluation window 106 and the editor window 104 may be combined so that, e.g., the evaluation window 106 includes fields for editing input parameters.

The interface component 102 receives inputs of various supply units from various suppliers. For example, the interface component 102 may receive input of supply units in terms of available raw hours of time, per month, that a supplier can provide. A supplier generates the input of supply units that the supplier can provide based on the number of hours per month he can provide to the enterprise. The supply units may, in various embodiments, be broken down to number of hours of particular skill sets or applications per month the supplier can provide. Because a software development pipeline may have a large number of projects, the number and different type of supplier (and therefore types of input supply hours) may be vast.

The interface component 102 additionally receives inputs of various demands from various business units or specific projects within the enterprise. For example, the interface component 102 may receive input of demand units in terms of skill sets and number of hours of time over the course of a given project. The demand units may, similarly to supply units, be broken down to number of hours of particular skill sets or applications necessary to completion of a given project. Each project in the pipeline will have a demand associated with it in order for the project to be completed.

in various embodiments, the user may enter milestone dates which may include target, actual, or planned dates and/or milestones, for example, by entering in a text field, or choosing from a drop-down menu. Such target, actual or planned dates and/or milestones may include, for example, start dates, approval dates, various contract dates, drop dates, delivery dates, and or warranty dates. The milestone dates may, in various embodiments, identify the contract and code-drop dates for a given project. In various embodiments, the user may additionally enter various release dates and hours of labor anticipated, planned, or actually used, in a release date field (text field or drop-down menu). A project may, in various embodiments, have a release date for different components of the project, such as when a project requires both hardware and software components that are released at specific release times, and which may be similar or different from each other. In various embodiments, in the edit window of the interface component 102, the user may enter a priority for the project, either in a drop-down menu or a text field. In additional text fields or drop-down menus, the user may enter or select various duration calculations that may be used, for example, in tracking progress and for setting the code-drop time-line based on the release (employing, for example, the spreading algorithm disclosed in U.S. patent application Ser. No. 11/195,964, entitled "Spreading Algorithm for Work and Time Forecasting," referenced above). Spreading involves using data relating to consumption schedules to estimate resource consumption in each phase of a task to obtain greater insight into and understanding of future needs, and timing projects such that they are feasible within the limits of available resources, and affordable within the limits of budgets.

The interface component 102 additionally receives inputs relating to burn rate analysis, e.g., the historical actual inputs. The burn rate reflects the amount of demand by hours over time for a given project. The burn rate analysis on historical actual inputs provides the user with a view of how fast work has been accomplished in the past using which particular resources, which in turn gives insight on how much work can reasonably be expected to be accomplished in the future. Using the historical actual inputs and the burn rate, a threshold may be determined for how reasonably quickly supply and/or demand may be altered or re-allocated to successfully accomplish work. The threshold may be used to determine the accuracy, usefulness, and reasonableness of the predictive model based on inputs for ongoing and planned projects.

The interface component 102 also receives inputs relating to productivity analysis, e.g., productivity inputs. The productivity inputs are historical because they are patterns in productivity as affected by training schedules and timing, common vacation schedules, and common times for sick leave and administrative time. The productivity inputs are useful because raw supply, the pure number of hours ideally worked by the employees, contractors, and vendor laborers, does not accurately reflect the actual number of hours that may be worked on a project. The productivity inputs take into account in supply that workers lose time to training and administration, such as meetings, entering time, and the like, as well as the fact that productivity goes down during the times of the year when many workers take vacation (i.e., holidays, summer time, spring break, etc.) or get sick (i.e., more people are out in the winter and flu season). The productivity inputs may be utilized to determine a productivity multiplier which may vary periodically (i.e., monthly, with each season, etc.). The productivity multiplier may be applied to the aggregate supply (input to the interface component 102, as discussed above) to result in a more accurate assessment of available supply at any given time. For example, a business unit may employ 100 employees, contractors, and outside laborers, all at a full time rate of 40 hours per week, leading decision makers to assume that 4000 hours a week are available for working on an important project. Realistically, however, patterns in productivity analysis reveal that during some parts of the year, the supply will not actually provide the expected number of hours a week. For instance, during November and December, around various holidays, the actual number of hours worked may only be 70% of the expected number of hours. By acknowledging that productivity may be lower during certain periods of the year, due to patterns in training, vacation, sick time, and administrative time, decision makers can adjust timing of projects, adjust resources by adding or reallocating people, and the like. Furthermore, the patterns in productivity for the United States are different from those in other countries, due to different holidays, different cultural schedules for vacations, different patterns in sickness, and the like, all of which adds to accuracy of predictive planning when accounted for in supply that is outsourced to foreign countries.

The database component 104 stores inputs from the interface component 102. In various embodiments, the inputs from the interface component 102 are in a raw data form, and are stored in the database component 104. The database component 104 may also store the results from various other components, as will be discussed further below.

In various embodiments, the tool 100 optionally includes the computational component 106 that takes raw data from the interface component 102, via the database component 104, and applies a conversion algorithm to normalize the raw data into a format useful by the tool 100. In various embodiments, the computational component 106 converts the demand input into a number of Full Time Employees ("FTEs") representing the skills and time required by the demand. In various embodiments, the computational component 106 is optional, as is the conversion of demand to a number of FTEs. The supply input may similarly be converted by the computational component 106 from hours into a number of FTEs with particular application identities, capabilities or skill sets. When the supply inputs or demand inputs are converted, each may be stored in the database component 104. By normalizing all inputs into a common format, the tool may analyze a much more detailed view of the pipeline.

In various embodiments, the computational component 106 utilizes the historical actual inputs to determine the burn rate. As discussed previously, the burn rate is the amount of demand, in hours, over time for a given project.

The growth analysis component 108 combines the supply and the demand in order to generate a predictive model of the achievable growth in supply and demand over time. The model generated by the growth analysis component 108 may further include factors input by the suppliers regarding the amount of time necessary to grow the supply, such as hiring and training environments that affect the ability of the supplier to hire and/or train new employees to meet the demand. The model generated by the growth analysis component 108 may additionally include the productivity inputs, as they affect the aggregate supply, to more accurately define the supply in the model. The model may permit a user to adjust one or more inputs of supply or demand, and see the modeled effect of the adjustment before actually implementing a change in the supply or demand.

The growth analysis component 108 aggregates the inputs, and calculates an overall labor supply/demand balance. The overall labor supply/demand balance is the amount by which the demand exceeds the supply. The balance is then compared to the historical actual inputs. A constraint arises when, in comparing the balance to the historical actual inputs, the difference between the balance and the historical actual inputs exceeds a reasonable threshold. For example, when the demand exceeds the supply by 500 man hours, and historically, increases in the supply have not exceeded more than 5% of 100 man hours, a constraint arises at the point in the pipeline when the demand so exceeds the supply. When such a constraint arises, an alert is displayed to the user.

The evaluation window 106 displays the predictive model generated by the growth analysis component 108 over time, detailed views of the various projects in the software development pipeline, and reports generated by the reporting component 110. The reporting component 110 is operable to generate reports relating to the predicted balance (i.e., comparison) between supply and demand in the model and reports based on historical data pertaining to what may reasonably be achieved in the future. In various embodiments, the reporting component 110 generates a coded report, wherein, in the aggregate, a first code indicates time periods when the predicted supply exceeds the predicted demand, and a second code indicates time periods when the demand exceeds the supply. In various embodiments, the "code" of the coded report means that it is color coded, such that a green alert is displayed when the supply exceeds the demand, and a red alert is displayed when the demand exceeds the supply. Alternatively, the code of the coded report may mean that the report displays an alert such as a flag or stop sign, or bolds or highlights the time periods indicated. Still another code may be displayed in the report when the difference between the demand and the supply exceeds a reasonable threshold representing how quickly supply and demand can be expected to change in order to balance the two.

The growth analysis component 108 allows the model to be refreshed as time passes, and to adjust the model in attempts to balance the supply with the demand. For example, it may be desirable in various embodiments to adjust either supply, demand, or both before making management decisions in favor of growth, either positive growth through hiring, or negative growth through terminating employees. In various embodiments, the growth analysis component 108 may enable one to adjust the supply (or automatically adjust the supply without direction from the user) by reallocating existing resources to change the supply (i.e. moving people from one project to another), and providing additional training to existing resources (i.e. reallocating people by training them for new skill sets that they previously did not have). Such adjustments change the supply without growth.

In various embodiments, the growth analysis component 108 may enable one to adjust the demand (or automatically adjust the demand without direction from the user) by adjusting the timing of at least one project in the pipeline (i.e., by moving the project up in the pipeline to a point in time where adequate resources are available, or postponing it until adequate resources are available), canceling at least one project to free up resources in the pipeline, and reallocating existing resources to change the demand (i.e. sometimes skill sets similar to those requested may be reallocated to change the unmet demand).

The growth analysis component 108 may further be operable to manage growth to meet demand over time. The model may be adjusted through the growth analysis component 108 by adjusting the supply by hiring additional resources to meet demand, and terminating unnecessary resources when supply exceeds demand. The growth may, however, be managed more carefully by examining the balance in supply and demand over a course of time in the model, so that resources are not unnecessarily changed when upcoming events in the pipeline may negate the need for the change.

The growth analysis component 108 also compares the predictive growth model to the historical actuals from the burn rate analysis. The historical actual inputs are used by the growth analysis component 108 to determine a reasonable threshold that poses a limit on how quickly the supply or demand can be reasonably increased or decreased. If the difference between supply and demand in the model exceeds this reasonable threshold, an alert to the user is displayed to indicate that at the point in time in the software development pipeline, the supply cannot reasonably be grown to meet the demand (or alternatively, the demand cannot be decreased to meet the supply) and constraints will arise. The alert allows the user to give special attention to projects affected by the constraints, such as, for example, implementing timing changes and/or reassessment of priority of projects that contribute to the constraint. In various embodiments, the reasonable threshold is at least five percent (5%) and no more than ten percent (10%).

The productivity analysis component 118 is still further operable to improve the accuracy of the elasticity of the supply by applying the productivity multiplier to the aggregate supply in the predictive growth model. In various embodiments, the productivity analysis component 118 utilizes the productivity inputs to determine the productivity multiplier. To determine the productivity multiplier, the productivity analysis component 118 may, in various embodiments, aggregate the inputs, analyze patterns in the productivity inputs, and return a periodic productivity multiplier, such as a multiplier for each month, season, fiscal or planning quarter, and the like. The productivity multiplier accounts (in the aggregate supply) for the fact that workers are not always as productive as expected ideally due to various events that reduce the actual amount of work they dedicate to a project. Accounting for productivity gives a more accurate look at the aggregate supply and predicts how it can be increased and decreased within reasonable limits.

The productivity analysis component 118 multiplies the input supply, in the aggregate, by the productivity multiplier, for a more refined assessment of the supply, and thereby, a more accurate predictive model.

Figure 2:
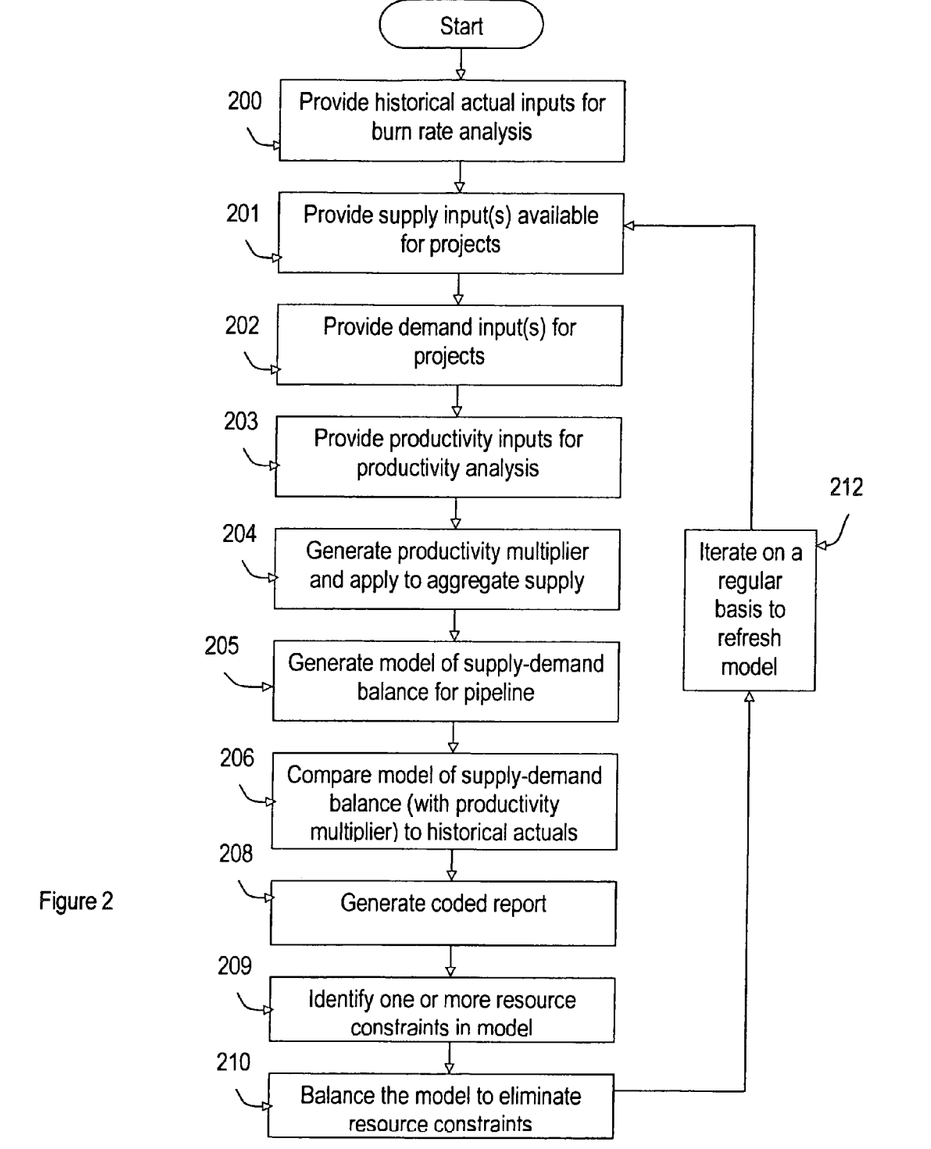
FIG. 2 is a block diagram of a software tool according to various embodiments of the present disclosure.

Referring to FIG. 2, a flowchart for a method of predictive growth management in accordance with various embodiments of the present disclosure is shown. The method begins with one or more historical actual inputs for burn rate analysis being provided (block 200). In block 201, one or more supply inputs are provided, reflecting the resource supply available for use in completing projects in the pipeline. Similarly, one or more demand inputs are provided (block 202), reflecting the resources necessary to completed projects in the pipeline. Both the supply and the demand may be, in various embodiments, disclosed as raw hours over time, or may be converted into numbers of employees with specific skill sets (based on the man-hours entered). In block 203, productivity inputs relating to patterns such as, for example, training, vacation schedules, sick time and administrative time are provided to the tool.

A periodic productivity multiplier is generated from the productivity inputs, and may be, optionally in various embodiments, applied to the supply inputs for each increment of time, such as monthly, seasonally, by each fiscal or planning quarter and the like (block 204). The productivity multiplier results in a more refined, accurate supply for use in generating the model of the balance between supply and demand.

A model of a balance between the supply and the demand is generated according to the inputs (block 205). The model extends, in various embodiments, over at least six planning quarters, reflecting the supply and demand for projects in the pipeline throughout the planning period. The model of the balance between supply (with or without the productivity multiplier in play) and demand is compared to the historical actuals to determine if the difference between the model and the actuals is within a reasonable threshold. The historical actuals and threshold serve as a check on whether the model is reasonable relative to what has been successfully accomplished in the past. For example, if the model predicts that a certain percentage of growth is possible during a short period of time, and the prediction in the model is way out of line with what is actually reasonable according to the historical actuals, then the predictive model is not as desirable for use in planning. In various embodiments, the reasonable threshold is around 5%, with a maximum difference of 10% for difference between the predictive growth model and the historical actuals.

Based on the model, one or more reports may be generated to reflect 1) a balance between the supply and the demand, with or without the productivity multiplier applied, and 2) the difference between the predictive growth model and the historical actuals, and whether the difference is within the reasonable threshold (block 208). The reports may be coded with a first code to reflect when the supply exceeds the demand, and a second code to reflect when the demand exceeds the supply. In various embodiments, the coded reports are color coded, such that a green alert is displayed when the supply exceeds the demand, and a red alert is displayed when the demand exceeds the supply. In various embodiments, the reports generated may comprise numerical reports or graphical reports. Similarly a first code may reflect when the difference between the predictive growth model and the historical actuals exceeds the reasonable threshold, and a second code may reflect when the difference between the two is within the reasonable threshold.

The method then identifies one or more resource constraints in the model generated (block 209). Such constraints may exist in periods of time in the model where the supply exceeds the demand, or where the demand exceeds the supply. Identifying resource constraints may be done by examining and analyzing reports generated in block 208. In various embodiments, the identifying resource constraints may be done by examining and analyzing the coded blocks of time to determine where in the pipeline the demand exceeds the supply.

The method continues as the model is adjusted and balanced to eliminate one or more of the resource constraints (block 210). This adjusting and balancing may be done by altering the supply without growth, altering the demand without growth, or by growing the supply or diminishing the demand. Actions relating to the adjusting and balancing may be entered into the tool 100 as an input, and the changes in the model may be examined to determine whether the action resulted in eliminating a resource constraint.

The method may iterate periodically, either on a regular basis such as once per month or once per quarter, or as needed from time to time, in order to refresh the model to reflect changes in the pipeline, and updates in the supply and the demand (block 212).

Figure 3:
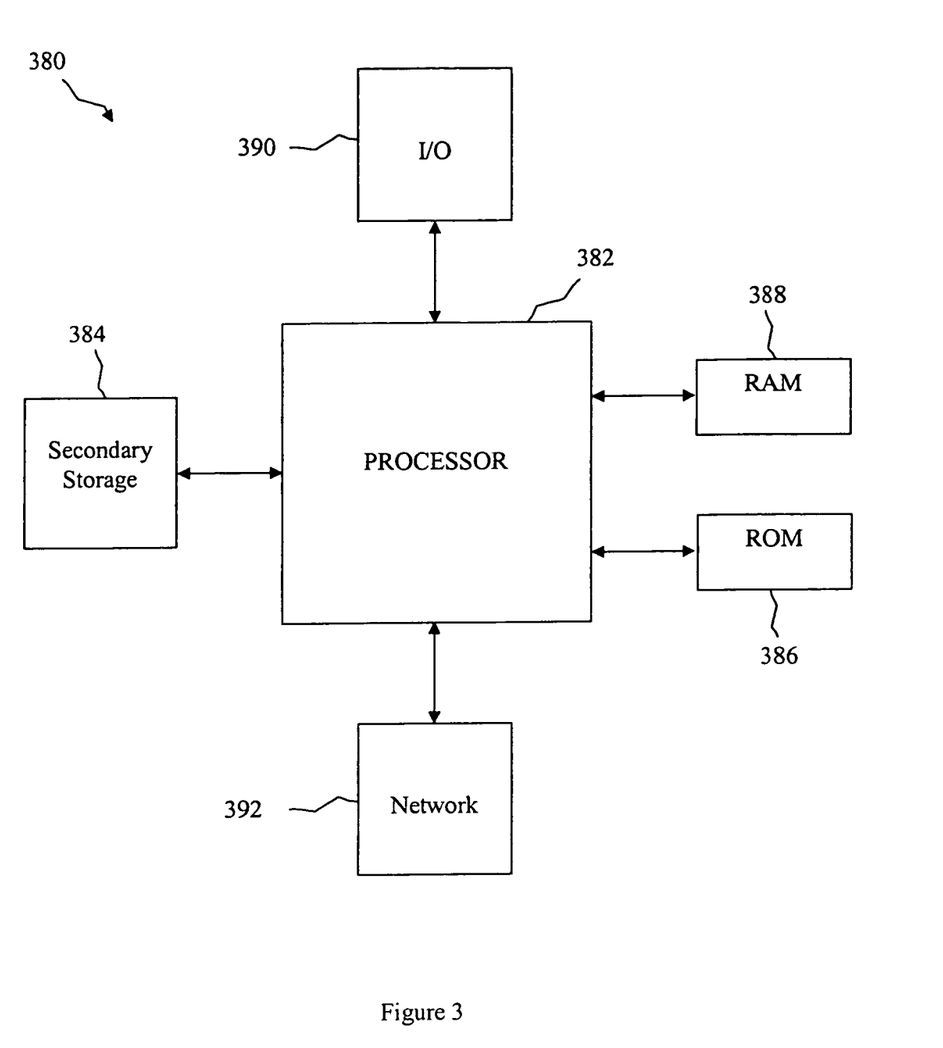
FIG. 3 illustrates an exemplary general purpose computer system suitable for implementing the several embodiments of the disclosure.

The system 130 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A software development pipeline planning tool that comprises:
    an interface component stored as executable instructions on a non-transitory computer-readable medium executable by a computer to accept, for each of multiple projects in a software pipeline, a set of inputs that includes 1) labor demand, 2) labor supply, and 3) one or more historical data points;
    a productivity analysis component stored as executable instructions on a non-transitory computer-readable medium executable by a computer to multiply a productivity multiplier by the labor supply to determine an effective labor supply, wherein the productivity multiplier is based on patterns in one or more of vacation schedules, sick time, administrative time, and training schedules, and varies by geography and at least one of month, calendar season, and fiscal planning period; and
    a growth analysis component stored as executable instructions on a non-transitory computer-readable medium executable by a computer to aggregate the inputs, calculate an overall labor supply/demand balance of an amount labor demand exceeds the effective labor supply, determine a threshold from historical data points indicating a cap on how quickly the labor supply may grow over a given period of time when labor demand exceeds the effective labor supply, compare the overall labor supply/demand balance to the threshold, and set a flag when the overall labor supply/demand balance exceeds the threshold.

2. The tool of claim 1, wherein the growth analysis component notifies a user if the difference between the overall labor supply/demand balance and the historical data exceeds the threshold.

3. The tool of claim 1, wherein the growth analysis component determines the threshold based on growth that was achievable in the past, based on the historical data points.

4. The tool of claim 1, wherein the threshold is at least a five percent (5%) difference and no more than a ten percent (10%) difference.

5. The tool of claim 1, wherein the growth analysis component accepts a new value for the threshold from the user.

6. The tool of claim 1, wherein the plurality of inputs of labor supply and labor demand further comprise labor supply for works-in-progress projects, labor demand for works-in-progress projects, labor supply placeholders for future project estimates, and labor demand placeholders for future project estimates.

7. The tool of claim 1, further comprising a reporting component that generates a coded report having a first code when the labor supply exceeds the labor demand, having a second code when the labor demand exceeds the labor supply and having a third code when the difference between the overall labor supply/demand balance and the historical data exceeds the threshold.

8. The tool of claim 1, further comprising a feedback component operable to adjust at least one of the labor supply and the labor demand; wherein
    1) adjusting the labor supply comprises at least one of reallocating existing labor supply, providing additional training, one of hiring additional labor supply, and terminating unnecessary labor supply; and
    2) adjusting the labor demand comprises at least one of adjusting the timing of at least one project, canceling at least one project, and reallocating existing labor supply to change the labor demand.

9. A method for predictive growth and burn rate analysis in software pipeline management that comprises:
    providing, by a processor, for each of multiple projects in a software project pipeline, a set of inputs that includes labor demand, labor supply, and one or more historical data points;
    aggregating, by a processor, the inputs;
    multiplying a productivity multiplier by the labor supply to determine an effective labor supply wherein the productivity multiplier is based on patterns in one or more of vacation schedules, sick time, administrative time, and training schedules, and varies by geography and at least one of month, calendar season, and fiscal planning period;
    calculating, by a processor, an overall labor supply/demand balance wherein the overall labor supply/demand balance is an amount by which labor demand exceeds the effective labor supply;
    determining, by a processor, a threshold from the historical data points indicating a cap on how quickly the labor supply may grow over a given period of time when labor demand exceeds the effective labor supply;
    comparing, by a processor, the overall labor supply/demand balance to the threshold; and
    setting, by a processor, a flag when the overall labor supply/demand balance exceeds the threshold.

10. The method of claim 9, further comprising notifying a user if the difference between the overall labor supply/demand balance and the historical data exceeds the threshold.

11. The method of claim 9, further comprising determining the threshold based on growth that was achievable in the past, based on the historical data points.

12. The method of claim 9, wherein the threshold is at least a five percent (5%) difference and no more than a ten percent (10%) difference.

13. The method of claim 9, further comprising reporting in a coded report; wherein the coded report reflects a first code when the labor supply exceeds the labor demand, a second code when the labor demand exceeds the labor supply and a third code when the difference between the overall labor supply/demand balance and the historical data exceeds the threshold.

14. The method of claim 9, further comprising applying a spreading algorithm that generates project timing for the projects in the software development pipeline such that the difference between the overall labor supply/demand balance and the historical data points does not exceed the threshold.

15. The method of claim 9, further comprising adjusting at least one of the labor supply and the labor demand, wherein:
    1) adjusting the labor supply comprises at least one of reallocating existing labor supply, providing additional training, hiring additional labor supply, and terminating unnecessary labor supply, and 2) adjusting the labor demand comprises at least one of adjusting the timing of at least one project, canceling at least one project, and reallocating existing labor supply to change the labor demand.

* * * * *